May 11, 1965     J. P. GILLIAM     3,182,682

COMBINATION TELESCOPIC VALVE AND UNION

Filed July 10, 1962

INVENTOR
James P. Gilliam

BY James M. Drysdale

ATTORNEY 3,182,682
COMBINATION TELESCOPIC VALVE AND UNION
James Paul Gilliam, R.F.D. 1, Box 596, Deland, Fla.
Filed July 10, 1962, Ser. No. 208,796
1 Claim. (Cl. 137—515.5)

This valve is designed to be readily accessible for repairs or replacements. Its principal use is to replace any faulty valve in the line by cutting in two the valve to be removed and removing the old valve. This combination telescopic valve and union can then be slipped into place and assembled without breaking down the existing system thereby saving much labor and material. As generally used, the mechanic uses a hacksaw and cuts in two the faulty valve. He then removes both ends of the old valve from the supply line. After this, he loosens slip nut on the above telescopic valve and slips it between the two ends of the pipe, screws the valve connector or sliding member on one end, screws the outer shell on the opposite end and finally tightens the slip nut whereby the telescopic valve is placed in operative position without disturbing the pipe line.

Another object is to provide a combination telescopic valve and union which may be readily installed in place with a minimum of effort and can be manufactured and assembled at low cost. All parts of the said device may be formed of stainless steel or other suitable wear resisting material.

Another object of this invention is to provide an improved valve of simplified construction, economical to manufacture and whose parts may be easily assembled as well as readily replaced or repaired in the event of accidental injury or wear induced by the fluids handled at the point of installation.

Various other novel objects and advantages of the invention will be hereinafter more fully referred to in connection with the accompanying description of the preferred form of the invention with reference to the drawing, wherein—

Figure 1:
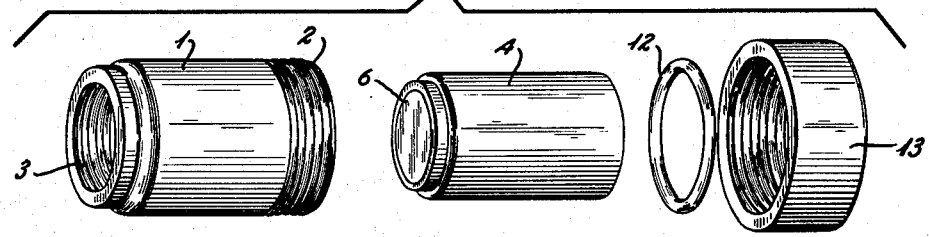
FIG. 1, is an exploded view of the parts forming the check valve.
Figure 2:
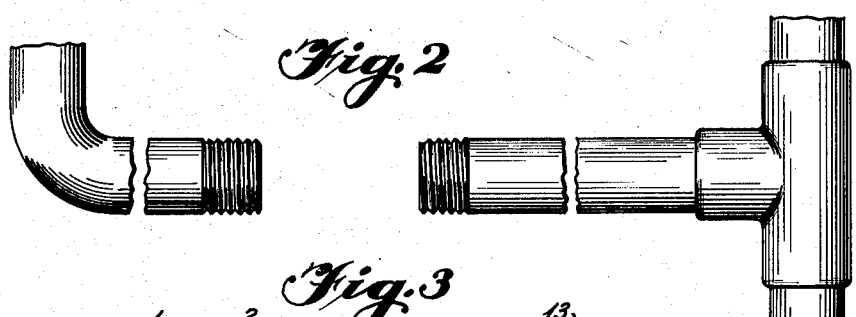
FIG. 2, illustrates the piping fixed in place and with faulty valve removed to receive valve shown in FIG. 1.
Figure 3:
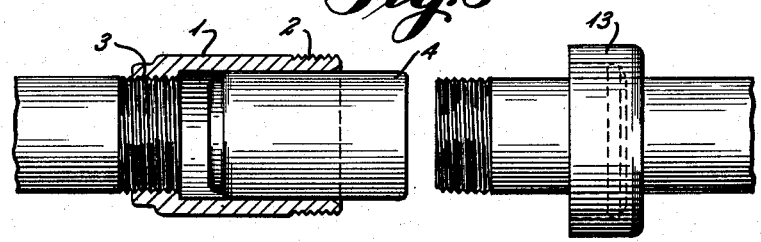
FIG. 3, is an enlarged fragment of the piping shown in FIG. 2 and with one end of the valve or outer cylindrical housing threaded in place.

Referring to the drawings more in detail, the invention will now be fully described.

The valve structure as illustrated in FIG. 1 consists of an outer cylindrical housing 1 having external threads 2 at one end and internal threads 3 at the other end, an inner cylindrical sliding member 4 having internal threads 5 at one end and a valve disk 6 mounted at the other end. The inner cylindrical member 4 is provided near one end with an inwardly projecting flange 7 of suitable width which extends beyond the central portion of the inner cylindrical member. A rod 8 passes longitudinally along the central axis of the inner cylindrical member and through a guiding hole 9 which passes through the end of the projecting flange 7. A coil compression spring 10 surrounds the rod 8 and bears at its outer end against a washer or disk 11 mounted at the outer end of the rod 8. At its inner end the compression spring 10 bears against the face 11¹ of the inwardly projecting flange 7. At its inner end the rod 8 is attached to the valve disk 6. In FIG. 1 is also shown a gasket 12 made of rubber or like material which may be used to render the valve mechanism air or water-tight when the internally threaded slip nut 13 is drawn up tight to secure both members of the valve in place. This gasket also prevents slipping of the sliding member 4.

Figure 4:
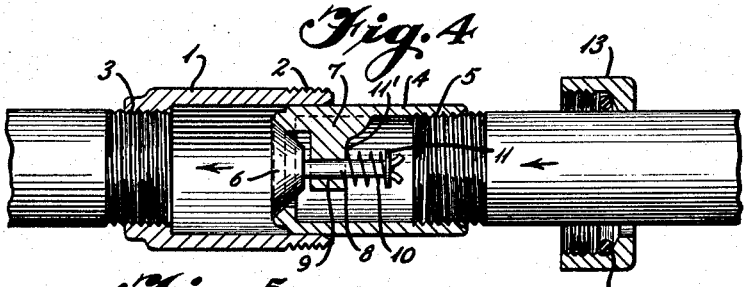
FIG. 4, is same as FIG. 3 and with sliding member of valve threaded to opposite pipe and, FIG. 5, shows the valve in place and with slip nut drawn up tight to secure both members of valve in place, also shows sliding member of valve in dot-dash lines to replace a shorter opening between the threaded ends of pipe.
Figure 5:
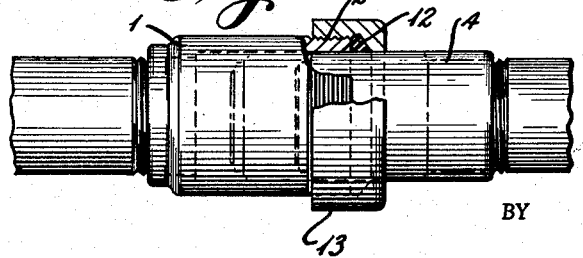

FIGS. 4 and 5 clearly illustrate this construction. When the valve mechanism is in place as shown in FIG. 4 the internally threaded slip nut 13 is moved forward and screwed onto the external threads 2 of the outer cylindrical housing 1 and the parts are firmly held in fixed operative position.

The valve structure above described may be used for fluid distribution lines of various pressures and has been constructed in various sizes, including very large valves for heavy duty installation as well as medium size valves to be installed in pipe lines of 2, 3 or 4 inches in diameter.

The operation of the valve structure will be readily apparent from the above description and a careful inspection of FIG. 4 of the drawing. Looking at this figure, it will be readily apparent that the water in the pipe line flowing in the direction indicated by the arrows will force open the valve disk 6 which normally is held closed by the tension imparted to the rod 8 by the coiled compression spring 10. The valve disk 6 and associated parts are indicated by dotted lines in FIG. 5 to show the valve in open position.

While we have described the invention in great detail and with respect to the present preferred form thereof, it is not desired to be limited thereto since changes and modifications may be made therein without departing from the spirit and scope of the invention.

From the foregoing description, it is thought to be obvious that a telescopic valve and union constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

A combined check valve and union in combination with aligned pipes of substantially the same internal and external diameter in a manner to keep the pressure losses to a minimum comprising a cylindrical tubular valve body member having a smooth exterior and having means on the inner portion of one end mounting the valve body on one of the aligned pipes, a tubular cylindrical housing having a smooth interior of substantially the same diameter as the exterior diameter of the tubular valve body slideably mounted on the tubular valve body, external threads at one end of said cylindrical housing, means on the interior of the other end of the cylindrical housing mounting the cylindrical housing on the other aligned pipe, the smooth interior of the cylindrical housing extending from the one end of the cylindrical housing to the mounting means on the other end and being of a diameter appreciably greater than the external diameter of the aligned pipes, an inwardly extending annular portion on the other end of said tubular valve body providing a valve seat and providing an opening of approximately the inside diameter of the aligned pipes, flange means on the interior of said tubular valve body, said flange having an axial bore, a valve rod slideably mounted in the bore in said flange, a valve head on said valve rod engaging the valve seat, and spring means to urge said valve rod and said valve head to valve seating position, the external diameter of the valve head being appreciably smaller than the external diameter of the tubular valve body and appreciably smaller than the interior diameter of the tubular cylindrical housing providing a fluid passage between the valve head and the housing whereby when the valve head is off of its seat and in open position there is substantial open area around the valve head in the order of the passage through the aligned pipes to avoid friction and pressure losses of fluids flowing through said combined check valve and union, an internally threaded slip nut having an inwardly projecting flange of a size to be threadedly mounted on the one end of said tubular housing with the opening in the flange portion of a size to pass over the cylindrical tubular valve body member, and a gasket in said internally threaded slip nut engaging the said one end of the tubular housing whereby when the slip nut is tightly screwed onto the cylindrical housing a fluid tight joint will be maintained between the tubular valve body and tubular housing while permitting axial length adjustment to permit installation of the combined check valve and union in aligned pipes which are fixed relative to each other.

References Cited by the Examiner

UNITED STATES PATENTS

| | | | |
|---|---|---|---|
| 291,066 | 1/84 | Maxwell | 251—148 |
| 948,221 | 2/10 | Hanson | 285—31 |
| 1,237,827 | 7/17 | Saunders | 137—541 XR |
| 1,613,887 | 1/27 | Gunn | 285—31 |
| 2,068,833 | 1/37 | White | 137—515.7 |
| 2,206,356 | 7/40 | Hutchings | 137—515.7 |
| 2,821,991 | 2/58 | Marx | 137—541 XR |
| 2,942,617 | 6/60 | Gilliam | 137—515.7 XR |
| 3,013,579 | 12/61 | Gilliam | 137—541 XR |

FOREIGN PATENTS 33,483   4/05   Switzerland.

M. CARY NELSON, *Primary Examiner.*

ISADOR WEIL, *Examiner.*